(12) United States Patent
Youngblood et al.

(10) Patent No.: US 12,482,550 B2
(45) Date of Patent: Nov. 25, 2025

(54) AUTOMATED VIBRATION DEVICE

(71) Applicants: Jimmy Youngblood, Richmond, TX (US); Matthew Currier, Cypress, TX (US)

(72) Inventors: Jimmy Youngblood, Richmond, TX (US); Matthew Currier, Cypress, TX (US)

( * ) Notice: Subject to any disclaimer, the term of this patent is extended or adjusted under 35 U.S.C. 154(b) by 195 days.

(21) Appl. No.: 18/130,888

(22) Filed: Apr. 4, 2023

(65) Prior Publication Data

US 2023/0317237 A1 Oct. 5, 2023

Related U.S. Application Data

(60) Provisional application No. 63/327,330, filed on Apr. 4, 2022.

(51) Int. Cl.
*G06Q 10/00* (2023.01)
*G16H 20/30* (2018.01)

(52) U.S. Cl.
CPC ................... *G16H 20/30* (2018.01)

(58) Field of Classification Search
CPC ..................................... G16H 20/30
See application file for complete search history.

(56) References Cited

U.S. PATENT DOCUMENTS

| 6,620,117 B1 | 9/2003 | Johnson et al. |
| 2014/0276273 A1 | 9/2014 | Leismer et al. |

FOREIGN PATENT DOCUMENTS

| WO | 2007078052 A1 | 7/2007 |
| WO | 2019189735 A1 | 10/2019 |

OTHER PUBLICATIONS

PCT/US2023/017500. International Search Report & Written Opinion (Jul. 5, 2023).

*Primary Examiner* — Rajesh Khattar
(74) *Attorney, Agent, or Firm* — Heidi Eisenhut; LOZA & LOZA, LLP (57) ABSTRACT

An automated vibration device control system is described. The system is capable of remotely, automatically operating a vibration device which is meant to vibrate a user. Automation allows the device to apply custom vibration patterns in order to achieve desired outcomes. The control system can be implemented with or without user input—at varying levels. These outcomes can be improved by calculating the ideal vibrations based on the user's physical measurements, preferences, and past outcomes. Past outcomes may be determined based on the current user or other users deemed, by the system, to have similar characteristics and goals.

16 Claims, 7 Drawing Sheets

SAGITTAL

POSTURAL/ CORONAL

FIG. 7

AUTOMATED VIBRATION DEVICE

PRIORITY CLAIM

This application claims priority to and the benefit of U.S. Provisional Patent Application No. 63/327,330, titled AUTOMATED VIBRATION PLATE, and filed on Apr. 4, 2022, at the United States Patent and Trademark Office, the entire content of which is incorporated by reference herein as if fully set forth below in its entirety for all applicable purposes.

FIELD

The present disclosure relates to exercise and therapy devices, and, more particularly, to vibration platform devices comprised of a vibration device for supporting the user and a vibration device configured and constructed to move the vibration device in a vibrating manner.

BACKGROUND

A vibration device is an exercise and therapy machine that stimulates the body's musculature through vibration patterns which trigger a stretch-contract reflex per muscle.

To use a vibration device, the user stands, sits, or lays on the device as it vibrates causing the entire body to vibrate with the device, which in turn causes contractile and stretch neurological reflexes in the muscles as the body attempts to maintain balance. When set to the optimal frequency, the majority of these autonomic musculature reflexes can be triggered at once. Differing the vibration frequency or vibration patterns triggers different intensities and durations of muscle reactions. Current systems generally operate in the 20-50 Hz range.

Currently, vibration device systems are manually operated by a user. Many models require a trained user or coach to facilitate. Further, they do not have the capacity to automatically cycle through a range of vibration settings.

In view of the above disclosure, what is needed in the art are vibration device systems that can be remotely and/or automatically operated to dynamically alter the vibration patterns generated in conjunction with a directed experience for the user.

BRIEF SUMMARY

The following presents a simplified summary of one or more aspects of the present disclosure to provide a basic understanding of such aspects. This summary is not an extensive overview of all contemplated features of the disclosure. It is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description presented below.

In one example, an automated vibration system is provided. The automated vibration system includes a vibration device and a control module in communication with the vibration device. The control module comprises a communication interface; a memory; and a controller operably connected to the communication interface and the memory and configured to: collect data from one or more sensors on the vibration device; record the data in the memory; calculate, using the data, vibration patterns to be applied the vibration device; and provide instructions to one or more vibration mechanisms on the vibration device with the vibration patterns causing the vibration device.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

In the following description, specific details are given to provide a thorough understanding of the described implementations. However, it will be understood by one of ordinary skill in the art that the implementations may be practiced without these specific details. For example, certain aspects may be illustrated with simplified representations in order not to obscure the implementations in unnecessary detail. In other instances, well-known techniques may be shown in broad block form in order not to obscure the described implementations.

Overview

The automated vibration device control system (or control module, hereinafter interchangeable) of the present disclosure is capable of remotely, automatically operating a vibration machine which is meant to vibrate a user. Automation of these mechanisms allows the machine to apply custom vibration patterns in order to achieve desired outcomes. These mechanisms can be implemented with or without user input—at varying levels. These outcomes can be improved by calculating the ideal vibrations based on the user's physical measurements, preferences, and past outcomes. Past outcomes may be determined based on the data of the current user or other users deemed, by the system, to have similar characteristics and goals.

These improvements could manifest as simply setting the frequency 30 Hz, then 50 Hz without user interaction. Or the improved settings could be derivations or calculations which yield alterations to the applied vibration patterns or sequence of vibration patterns. These derivations or calculations may be done on a local computing device or a remote computing device or server.

This present disclosure allows for remote control and data acquisition of the vibration mechanism. The controller can access the accompanying vibration device through either wired (e.g., USB or custom cable) or wireless (e.g., Bluetooth or Wi-Fi) connection. It can also connect to and utilize a permanent data-store to allow the user to store, retrieve, and analyze the data at a later time.

This present disclosure provides automation of the vibration mechanism. It can sense the presence of a user through user input, a range detector, force sensors, or visual feedback, or other types of sensors, and automatically begin the vibration therapy when the user is in place.

The control system can periodically adjust these settings in a sequence of patterns (known as a "recipe") to induce one or more stimuli known to achieve a particular outcome. The control system can also guide the user through a program, made up of one or more recipes, that is effective in achieving one or more outcomes.

Further, the control system can also guide the user through a program, made up of one or more recipes along with corresponding body positioning. The system may guide the user through written or audible commands, or an exemplary video or avatar demonstrating this positioning. The sequence of vibration patterns thus automatically adjusting in sequence with instructions given to the user.

Further, the multi-axial frequency and intensity of vibration can be optimized in real-time by accounting for sensor feedback. These measurements may be determined by on-board sensors, data capture from other systems, or user input either on a local interface or an external interface (such as a software application) at the time of usage or apart from active usage. Controlled adjustment of the multi-axial vibration can be achieved by calculating the interference patterns caused by the various vibration mechanisms (whether motors or actuators or sonic drivers) to produce a particular vibration pattern at a particular location or locations relative to the vibration device.

Further, the control system can account for the user's size and position relative to the device (via visual, force, or other sensor feedback) when adjusting the vibration pattern(s). The control system of can modify sequences of commands or programs of multiple sequences of commands on a local computing device to customize the device's output according to user requirements.

Real-time measurements may be taken which include force sensor feedbacks from the machine indicating where the user is applying pressure to the machine (i.e., leaning one direction or another), or whether they are holding the machine's handles [if provided]. The user's posture and body-position may be determined by visual feedback utilizing a machine learning model (e.g., Posenet.) General measurements may include, but are not limited to, the user's height, weight, and/or bone density. These measurements may be obtained via coupled sensors or via user input.

Segmented measurements, those of a particular body-part or body-sub-system, may include bio-impedance feedback across each limb or from a hand to a foot which help to indicate bone and muscle percentage of mass. Measurements may also include other bio-feedbacks such as electro-cardio signals or the sound detected by a microphone on or near the user which help to indicate cardiac performance (e.g., heart-rate, blood-pressure.)

It is notable that none of these measurements are necessary for usage of the system and its vibration can be adjusted and/or preset with none or any number of the previously described measurements.

The controller is capable of being retrofitted into or installed alongside an existing vibration motor controller. For example, an existing vibration device may operate one or more electric motors by varying the electrical power or frequency to the motor either through manual controls which allow selection of discrete modes (i.e., a particular frequency) and may or may not require a separate control signal to change the gear ratio of an in-built transmission or a separate control signal to adjust the interface point of the vibrator with the vibration device. The present disclosure allows for arbitrary selection of these settings by either adjusting the motor supply directly or indirectly and providing these control signals as needed in lieu of the manual controls.

Vibration devices include one or more vibrators, a platform, and one or more vibration mechanisms, including but not limited to mechanical, hydraulic, and/or pneumatic mechanisms that interface between the vibrator and platform.

Further, the control system may control a vibration device whose vibrations are caused by the mechanical, pneumatic and/or or hydraulic mechanisms which actuate the device directly or, for instance, actuate or rotate a mass whose movement, in turn, causes the device to vibrate.

Further, the control system may control a vibration device whose vibrations are caused by a sonic mechanism which generates pressure waves via sound which, in turn, vibrate the device.

The disclosed controller may also control multiple vibration mechanisms simultaneously. It may also oscillate or progressively change the power setting to create vibrations at a particular frequency or progression of frequencies as dictated by the recipe sequence for a specified outcome.

Figure 1:
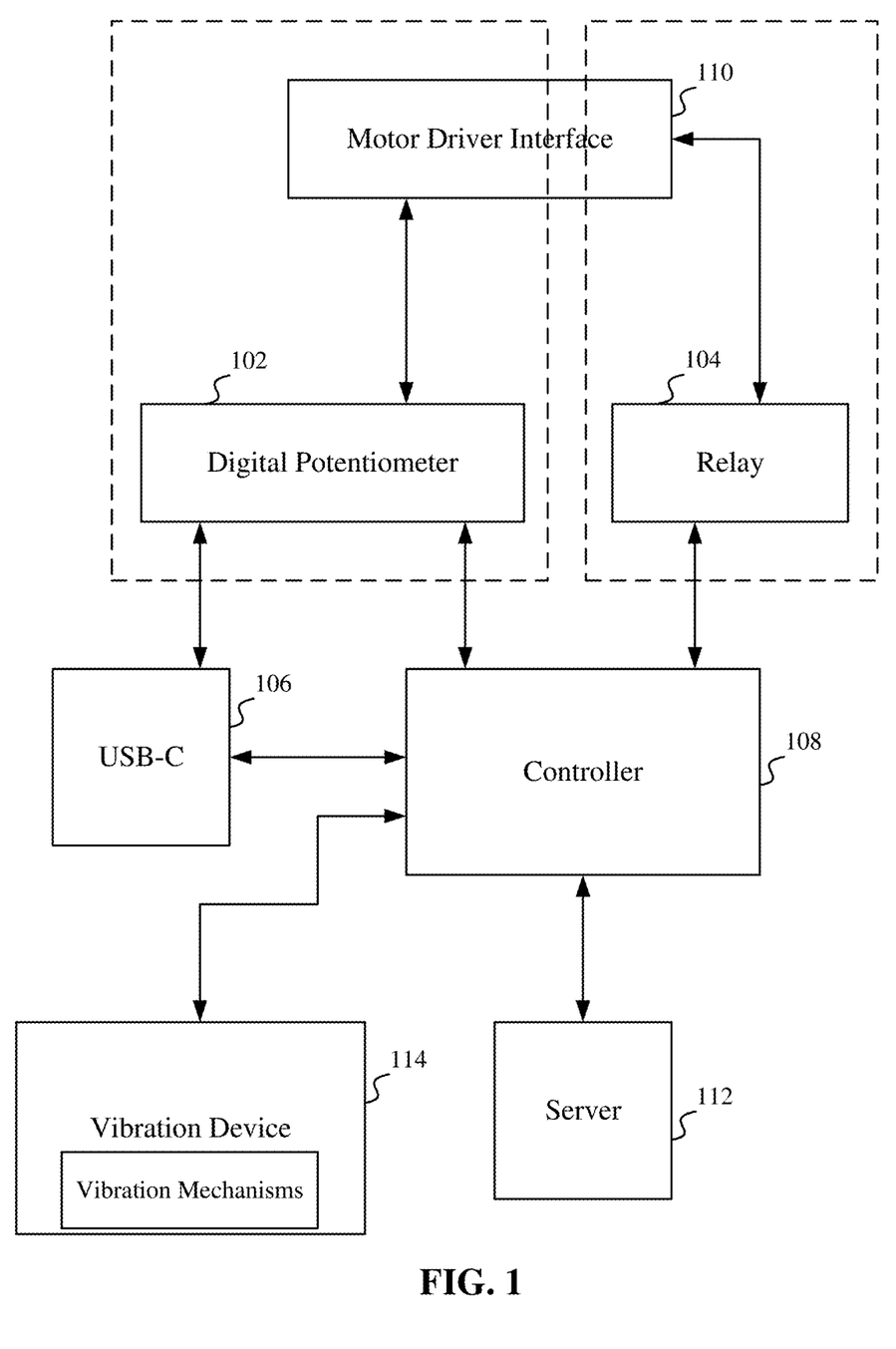
FIG. 1 illustrates a block diagram of a design implementation for a wireless-capable controller which connects to an existing motor controller, according to one aspect.

FIG. 1 illustrates a block diagram of a design implementation for a wireless-capable controller which connects to an existing motor controller, according to one aspect. The installation may be in standalone packaging or integrated into another control system. The dashed outlines indicate components that would be duplicated to accommodate multiple motor interfaces. In this instantiation the vibration motor frequency is controlled by varying voltage to the motor via a digital potentiometer 102; the power to the motor is controlled by a solid-state relay 104; and wired data transfer is enabled by the USB-C connector 106. The controller 108 itself has built-in antennae and chipsets to facilitate Bluetooth and Wi-Fi wireless communications.

Figure 2:
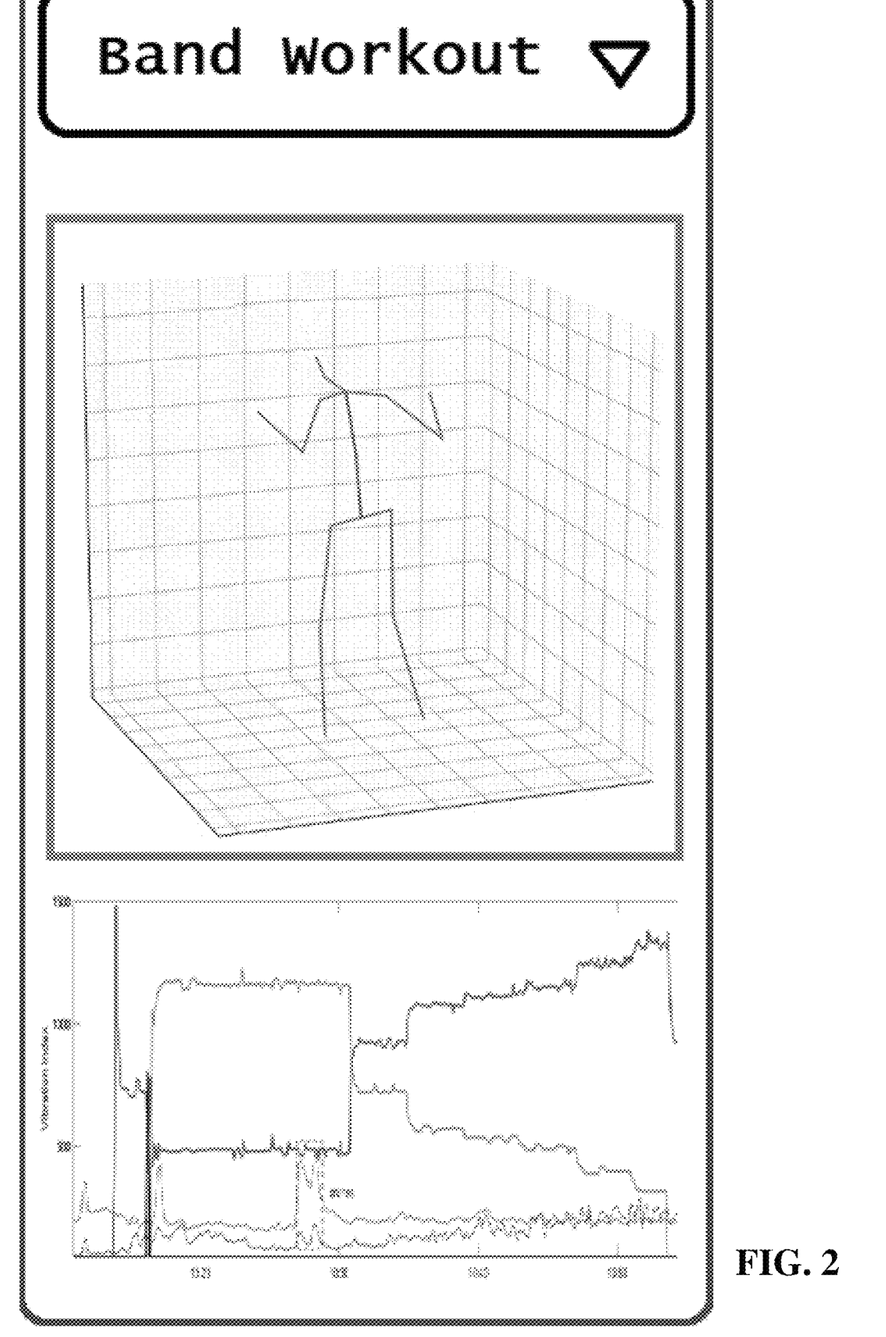
FIG. 2 illustrates a user interface which allows selection of a particular outcome and displays appropriate feedback.

The user interface 110 may be a local display, touchscreen, or button panel. The nominal system is a touchscreen interface which allows the user to re-engage with their desired settings and outcomes. FIG. 2 exemplifies a user interface which allows selection of a particular outcome and displays appropriate feedback. These include the body position, as determined by camera imagery processed by a machine-learning model, and a trend of vibration patterns and user center-of-mass readings.

The controller 108 may also interface with a server 112 which acquires and stores the usage data for later analysis. The server 112 is capable of presenting a user's data to them in a desired format and serving data to other entities when security and permissions allow (e.g., medical doctor or therapist.) The server 112 may also perform real-time or adjunct calculations to modify recipes specific to a user or other requirements.

The controller 108 interfaces 118 with a vibration device 114 for automating the vibration mechanisms of the vibration device 114.

Figure 3:
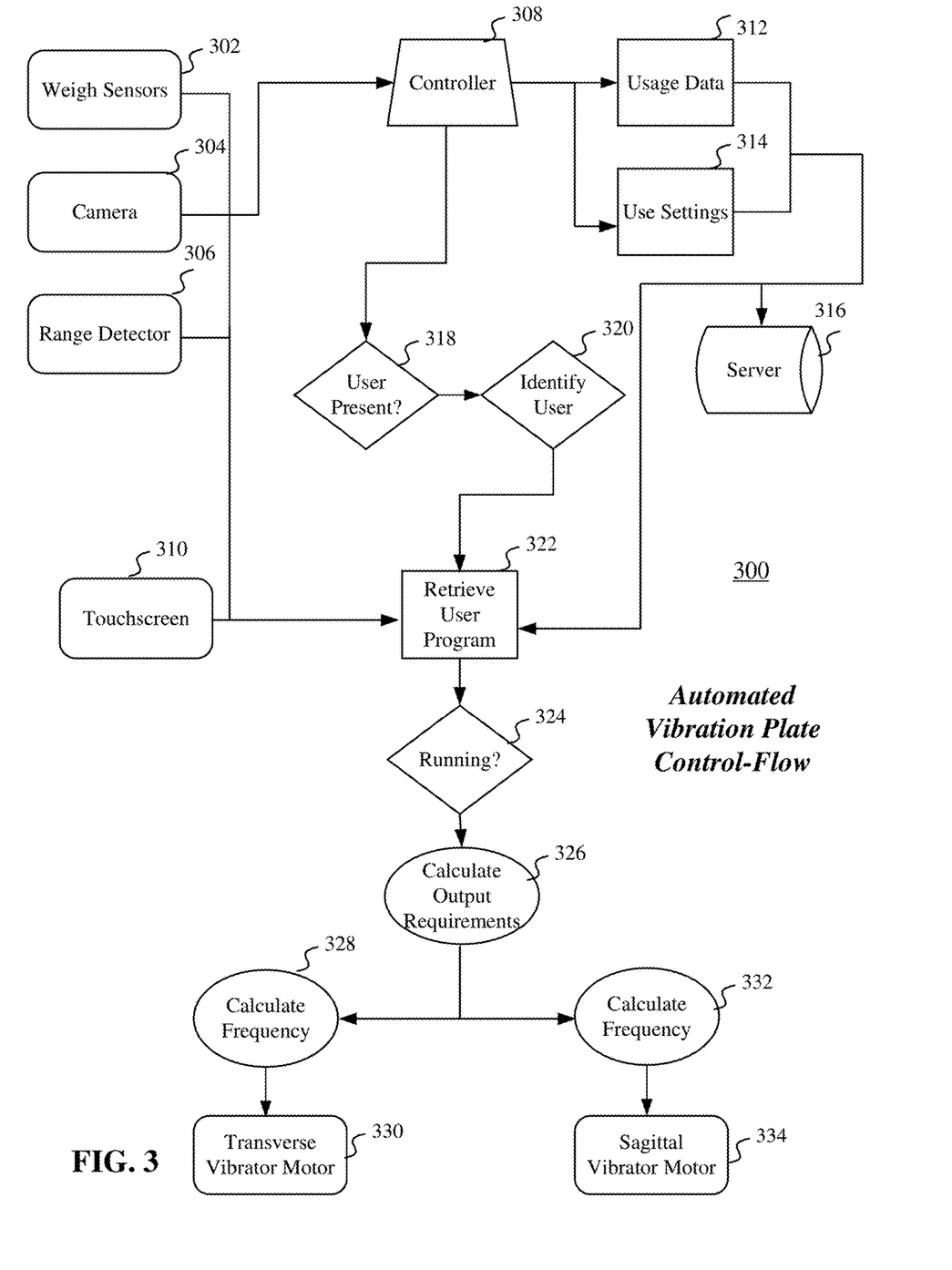
FIG. 3 is a flow diagram illustrating the automated vibration device control-flow according to an exemplary method of the present disclosure.

FIG. 3 is a flow diagram illustrating the automated vibration device control-flow 300 according to an exemplary method of the present disclosure. The implementation of the automated vibration device control-flow 300 may initially begin when a user stands on the vibration device. Data from force sensors 302, camera(s) 304, and/or a range detector 306 is collected and sent to a processor or controller 308. Additionally, data may be provided directly from the user via a touchscreen 310. From the data, the controller 308 may determine usage data 312 and use settings 314 for storage in a server 316.

Figure 6:
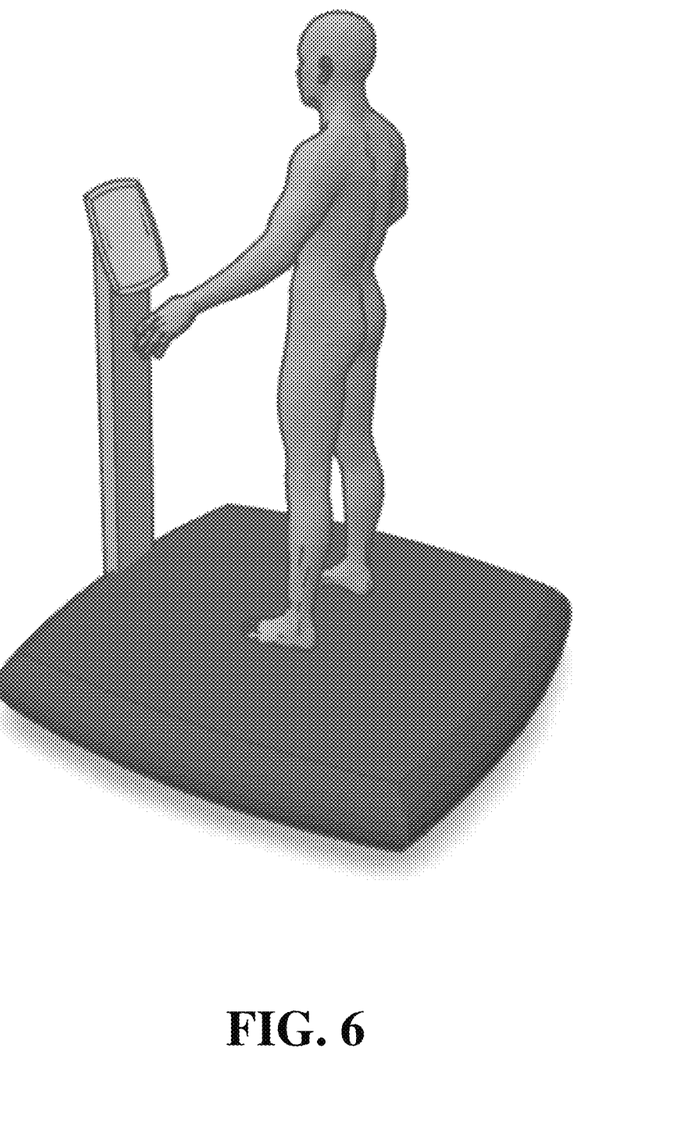
FIG. 6 illustrate a user on an automated vibration device.
Figure 7:
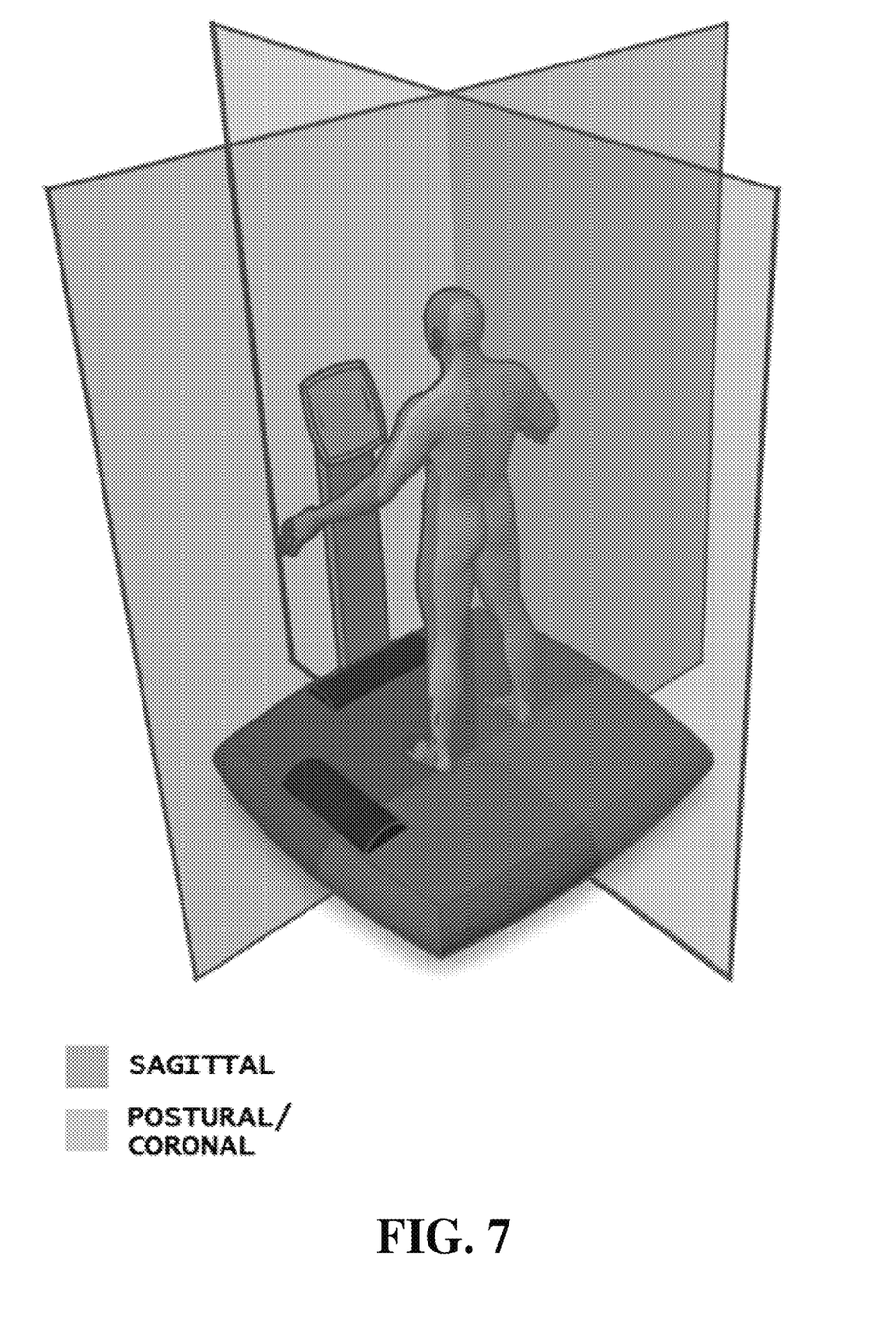
FIG. 7 illustrates the sagittal and postural/coronal planes on the automated vibration device.

The controller may determine if a user is present on the vibration device 318 and identify the user 320 by credentials [input by the user] or by visual recognition or some other means. Once the user has been identified, any user data or programs associated with the user is retrieved 322. The user may also select a program or profile using the touchscreen. If the program is running 324, output requirements are calculated 326. Once the output requirements are calculated, the frequency is calculated 328 for the transverse vibrator motor and provided to a transverse vibrator motor 330. The frequency is also calculated for a sagittal vibrator motor 332 and provided to the sagittal vibrator motor 334. Other implementations may use a lesser or greater number of vibration motors or other vibration mechanisms in a similar or different configuration. The vibration motor causes vibration by rotating an offset counterweight which causes the platform to rapidly move back and forth perpendicular to the axis of rotation. The sagittal vibration motor causes the platform to vibrate along an axis from the users front to back. The transverse vibration motor causes the platform to vibrate along an axis from the users left to right. The interference pattern between the vibration of the platform along both axes can create more complex vibration patterns, i.e., vibration in more than just the two dimensions. FIG. 6 illustrate a user on an automated vibration device while FIG. 7 illustrates the sagittal and postural/coronal planes on the automated vibration device.

Figure 4:
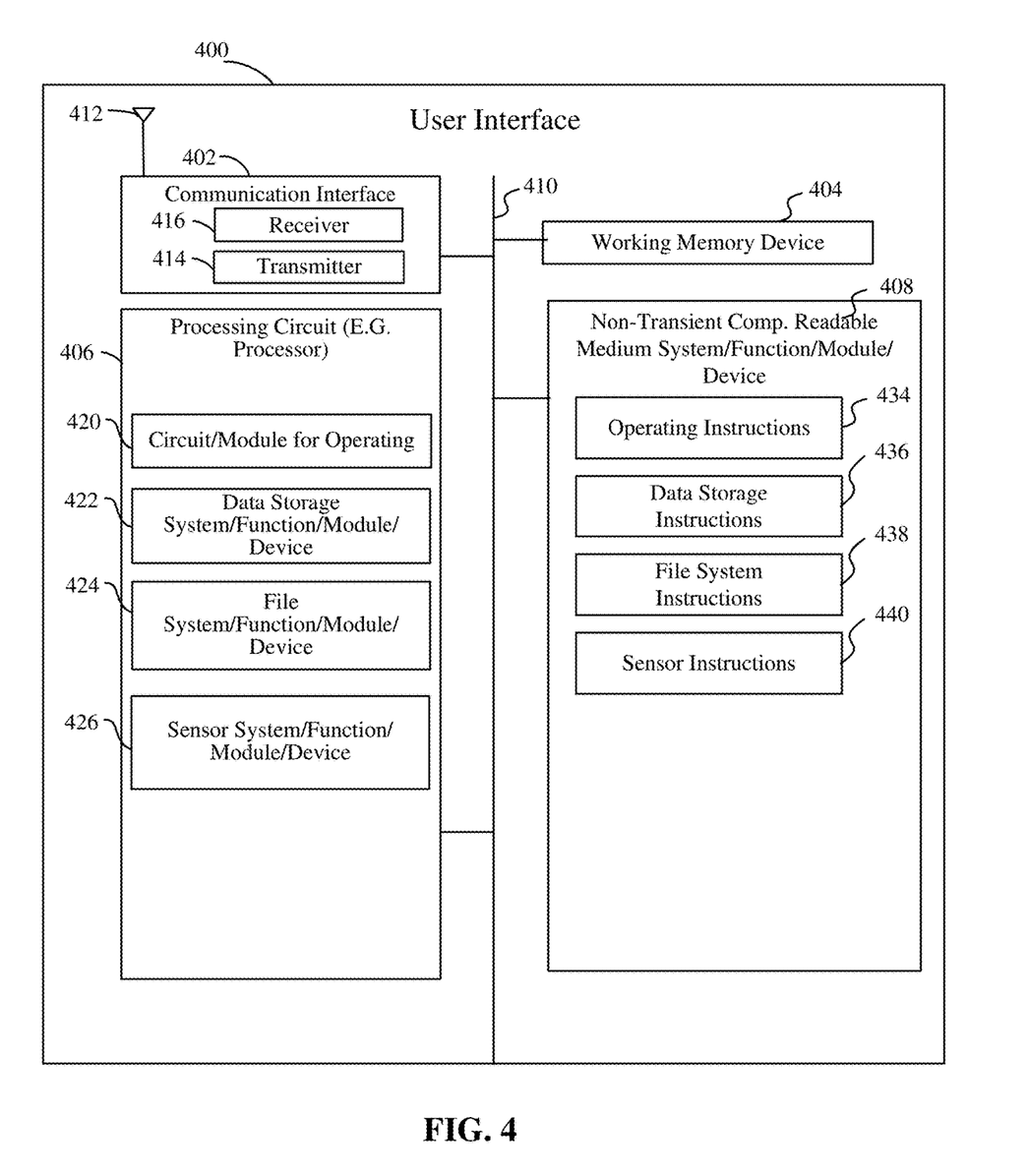
FIG. 4 illustrates a block diagram of an example hardware implementation of a user interface apparatus configured to communicate according to one or more aspects of the disclosure.

FIG. 4 illustrates a block diagram of an example hardware implementation of a user interface apparatus 400 configured to communicate according to one or more aspects of the disclosure. The user interface module 400 may include, for example, a communication interface 402. The communication interface 402 may enable data and control input and output. The communication interface 402 may, for example, enable communication over one or more communication networks. The communication interface 402 may be communicatively coupled, directly or indirectly, to the communication network(s). The user interface module 400 may include a working memory device 404, and a processor system/function/module/device (hereinafter the processor 406). The processor 406 may use the working memory device 404 to store data that is about to be operated on, being operated on, or was recently operated on. The processor 406 may store instructions on the working memory device 404 and/or on one or more other memory structures or devices, such as, for example, non-transient computer readable medium system/function/module/device (hereinafter the non-transient computer readable medium 408.) When executed by the processor 406, the instructions may cause the processor 406 to perform, for example, one or more aspects of the methods described herein.

The user interface module 400 may be implemented with a bus architecture, represented generally by the bus 410. The bus 410 may include any number of interconnecting buses and bridges depending on the specific application of the user interface module 400 and overall design constraints. The bus 410 may communicatively couple various circuits including one or more processors (represented generally by the processor 406), the working memory device 404, the communication interface 402, and the non-transient computer readable medium 408. The bus 410 may also link various other circuits and devices, such as timing sources, peripherals, voltage regulators, and power management circuits and devices, which are well known in the art, and therefore, are not described any further.

The communication interface 402 provides a means for communicating with other apparatuses over a transmission medium. In some implementations, the communication interface 402 includes circuitry and/or programming adapted to facilitate the communication of information bi-directionally with respect to one or more communication devices in a network. In some implementations, the communication interface 402 is adapted to facilitate wireless communication of the user interface module 400. In these implementations, the communication interface 402 may be coupled to one or more antennas 412 as shown in FIG. 4 for wireless communication within a wireless communication system. In some implementations, the communication interface 402 may be configured for wire-based communication. For example, the communication interface 402 could be a bus interface, a send/receive interface, or some other type of signal interface including drivers, buffers, or other circuitry for outputting and/or obtaining signals (e.g., outputting signal from and/or receiving signals into an integrated circuit.) The communication interface 402 can be configured with one or more standalone receivers and/or transmitters, as well as one or more transceivers. In the illustrated example, the communication interface 402 includes a transmitter 414 and a receiver 416. The communication interface 402 serves as one example of a means for receiving and/or a means for transmitting.

The processor 406 may be responsible for managing the bus 410 and general processing, including the execution of software stored on the non-transient computer readable medium 408. The software, when executed by the processor 406, may cause the processor 406 to perform the various functions described below for any apparatus or module. The non-transient computer readable medium 408 and the working memory device 404 may also be used for storing data that is manipulated by the processor 406 when executing software.

Figure 5:
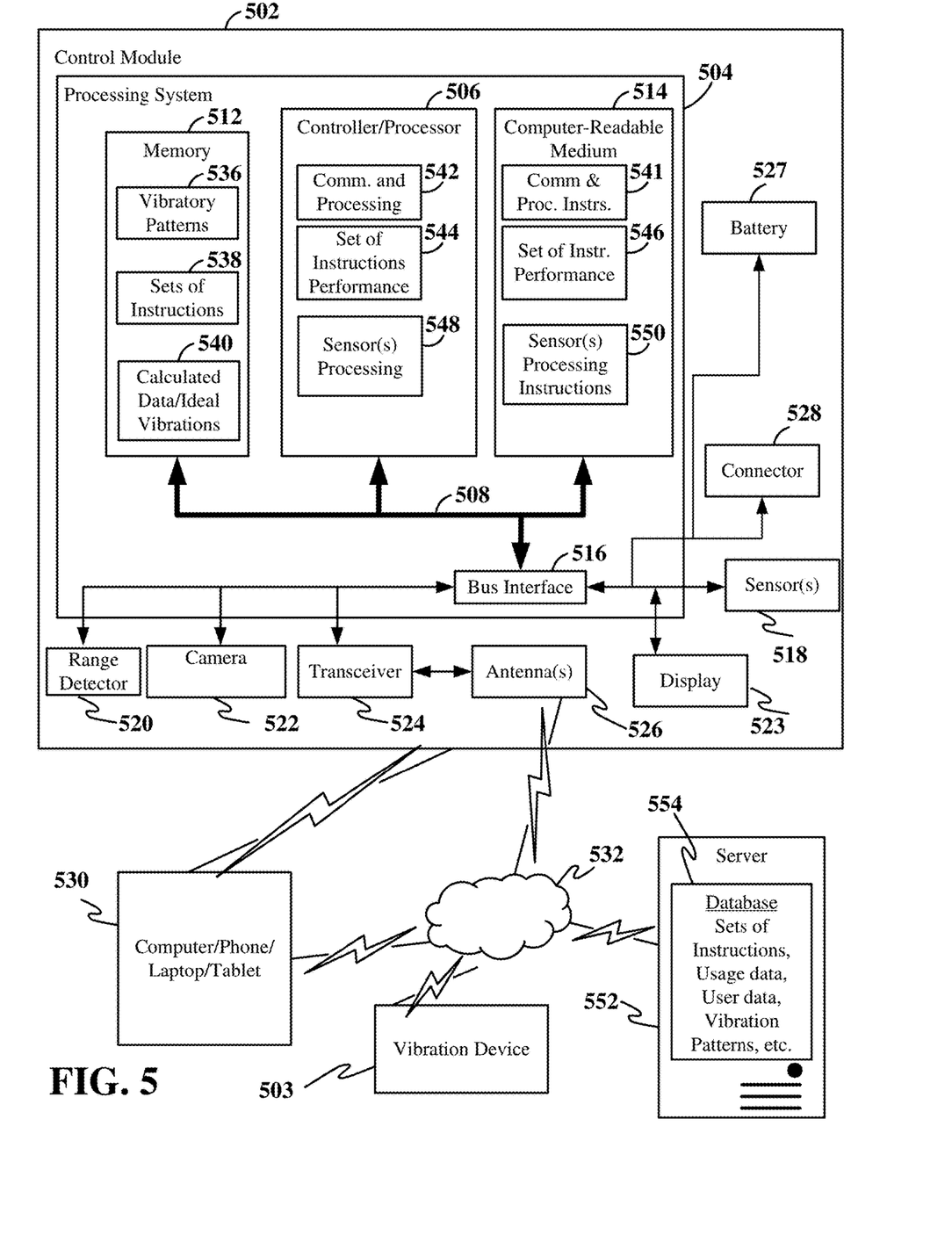
FIG. 5 is a block diagram illustrating an example of a hardware implementation of the control module employing a processing system according to some aspects of the disclosure.

FIG. 5 is a block diagram illustrating an example of a hardware implementation of the control module 502 employing a processing system 504 according to some aspects of the disclosure. The control module 502 may be utilized in, or in connection with, a vibration device 503.

In accordance with various aspects of the disclosure, an element, or any portion of an element, or any combination of elements, may be implemented with a processing system 504 that includes one or more controllers (or processors), such as processor/controller 506. Examples of controllers 506 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the control module 502 may be configured to perform any one or more of the functions described herein. The controller 506, as utilized in the control module 502 for the automated vibration device, may be used to implement any one or more of the methods or processes described and illustrated herein.

In this example, the processing system 504 may be implemented with a bus architecture, generally represented by the bus 508. The bus 508 may include any number of interconnecting buses and bridges depending on the specific application of the processing system 504 and the overall design constraints. The bus 508 links together various circuits, including one or more controllers (represented generally by the controller 506), a memory 512, and computer-readable media (represented generally by the computer-readable medium 514). The bus 508 may also link various other circuits such as timing sources, peripherals, voltage regulators, and power management circuits, which are well known in the art and will not be described further.

A bus interface 516 provides an interface between the bus 508 and a plurality of additional circuits/functions, including sensors 518 (e.g., force sensors), range detector 520, a camera 522, a display 523, a transceiver 524, and antenna(s) 526. The preceding lists were exemplary and non-limiting. In some examples, a connector 528 may be fixed to (e.g., not removable from) the vibration device 503. Connectors may include, but are not limited to USB, RJ11, and/or RJ45 types of connectors. The connector 528 may be used to connect the vibration device 503 to an external device, such as a computer, phone, laptop, tablet, or any other electronic device 530. Alternatively, the vibration device 503 may communicate with a computer, phone, laptop, tablet, or any other electronic device 530 wirelessly via the communications network, represented by the cloud 532. The control module 502 may communicate with one or more third-party applications on the external device.

The transceiver 524 and antenna(s) 526 may provide a communication interface or a means for communicating with various other apparatus over a transmission medium (e.g., a wireless interface). The transceiver 524 may be a wireless communication interface. For example, the wireless communication interface 524 may be configured to permit a user to interface with the vibration device 503 via Bluetooth®, WiFi®, WiMAX®, LTE, 4G, 5G and beyond, or the like. The one or more antennas 526 may be configured to operate at the frequency or frequencies utilized by the wireless communication interface 524.

The controller 502 may be responsible for managing the bus 508 and general processing, including executing software stored on the computer-readable medium 139. The software, when executed by the controller 123, causes the processing system 120 to perform the various functions described below for any particular apparatus. The computer-readable medium 514 and the memory 521 may also be used for storing data manipulated by the controller 506 when executing software. For example, the memory 512 may store vibration patterns or sequences of vibration patterns 536, sets of instructions 538 generated to provide an vibration device 503 that obtains a specific exercise workout, and calculated data 540 which includes calculated ideal vibrations based on the user's physical measurements, preferences, and past outcomes, as well as the multi-axial frequency and intensity of vibration using sensor feedback. The preceding list is exemplary and non-limiting.

The control module 502 may be powered by a battery 527. The battery 527 may be located within the control module 527 as shown in FIG. 5 or may alternatively be located outside the control module 502 in or on the vibration device 503. The battery 527 may be charged through the connector on the control module 502 or may be charged wireless, such as using a Qi wireless charger. Alternatively, the battery 527 may be located separately from the vibration device 503 and plugged into a power outlet.

One or more controllers (such as the controller 506) in the processing system 504 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 514.

The computer-readable medium 514 may be a non-transitory computer-readable medium. A non-transitory computer-readable medium includes, by way of example, a magnetic storage device (e.g., hard disk, floppy disk, magnetic strip), an optical disk (e.g., a compact disc (CD), or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 514 may reside in the processing system 504, external to the processing system 504, or distributed across multiple entities, including the processing system 504. The computer-readable medium 514 may be embodied in a computer program product. By way of example, a computer program product may include a computer-readable medium in packaging materials. In some examples, the computer-readable medium 514 may be part of the memory 512. Those skilled in the art will recognize how best to implement the described functionality presented throughout this disclosure depending on the particular application and the overall design constraints imposed on the overall system. In some examples, the computer-readable medium 514 may be implemented on an article of manufacture, which may further include one or more other elements or circuits, such as the controller 506 and/or memory 512.

In some aspects, the control module 502 may include the memory 512 and the controller 506 configured to perform any of the methods, functions, or algorithms described herein. In some aspects of the disclosure, the controller 506 may include circuitry configured for various functions. For example, the controller 506 may include communication and processing circuitry/function 542 (also referred to as the communication and processing circuitry 542 for the sake of brevity), configured to communicate with other devices internal and external to the control module 502, for example, via interfaces therebetween.

In some examples, the communication and processing circuitry 542 may include one or more hardware components that provide the physical structure that performs processes related to communication (e.g., signal reception and/or signal transmission) and signal processing (e.g., processing a received signal and/or processing a signal for transmission). In some examples, the communication and processing circuitry 542 may include one or more hardware components that provide the physical structure that performs processes related to processing, such as, for example, calculating ideal vibrations 540, sets of instructions 538, and vibration patterns 536 from the memory 512 and processing such data to limit the features of the vibration device 503 accordingly. In some implementations where the communication involves receiving data from the sensor(s) 518 and the ranged detector 520 for example, the communication and processing circuitry 542 may obtain the data, process the data, and output the processed data. For example, the communication and processing circuitry 542 may output the processed data to another component of the controller 506, the memory 512, or the bus interface 516. In some examples, the communication and processing circuitry 524 may receive one or more of signals, messages, other information, or any combination thereof. In some examples, the communication and processing circuitry 524 may include functionality for a means for receiving and/or a means for transmitting.

In some aspects of the disclosure, the controller 502 may include a set of instructions performance circuitry/function 544 configured for various functions, including operating the camera 520, or the display 523, for example.

The set of instructions performance circuitry 544 may further be configured to execute sets of performance instructions 546 (e.g., software) stored on the computer-readable medium 514 to implement one or more functions described herein. The sets of instructions may be used for controlling the vibrations.

In some aspects of the disclosure, the controller 506 may include, for example, sensor(s) processing circuitry/function 542, configured for various functions including, for example, obtaining information from sensor(s) 518 and the range detector 520 and acting on such information. For example, sensor(s) 518 may include, but are not limited to a heart-rate sensor, a blood pressure sensor, pressure sensor, a camera, and/or force sensor. The feedback from the sensors allows the device to determine where the user is applying pressure to the machine (i.e., leaning one direction or another), or whether they are holding the machine's handles [if provided] as well as the user's posture and body-position may be determined by visual feedback utilizing a machine learning model. Usage of the feedback from sensors may be used to determine the optimal vibration sequencing, for example. The sensor(s) processing circuitry/function 548 may further be configured to execute sensor(s) processing instructions 550 to implement one or more functions described herein.

According to some aspects, the control module 502 (or the controller 506) described herein may communicatively couple to a server 552, which may be a remote server 552 and may pull data from and push data to a database 554 maintained at the server 552. Coupling may be via a communications network, represented by the cloud 532. Use of data, such as sets of instructions, feedback data, etc. stored in the database 554 at the server 552 by the end user may facilitate and improve the end user's workout.

One or more processors, such as processor 506 in the user interface module 500 may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer readable medium, such as non-transient computer readable medium 508. Non-transient computer readable medium 508 may include, by way of example, a magnetic storage device (e.g., hard disk, floppy disk, magnetic tape, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable non-transient medium for storing software, date, and/or instructions that may be accessed and read by a computer or the processor 506. Computer readable media may also include, by way of example, a carrier wave, a transmission line, and any other suitable medium for transmitting software and/or instructions that may be accessed and read by a computer or the processor 506. The non-transient computer readable medium 508 may reside in the user interface module 500 (e.g., local data storage device), external to the user interface module 500 (e.g., remote data storage device), or distributed across multiple entities including the user interface module 500.

The processor 506 is arranged to obtain, process and/or send data, control data access and storage, issue commands, and control other desired operations. The processor 506 may include circuitry configured to implement desired programming provided by appropriate media in at least one example.

The non-transient computer readable medium 508 may be embodied in a computer program product. By way of example, a computer program product may include a computer readable medium in packaging materials. Those skilled in the art will recognize how best to implement the described functionality presented throughout this disclosure depending on the particular application and the overall design constraints imposed on the overall system.

In some aspects of the disclosure, the processor 506 may include circuitry configured for various functions. For example, the processor 506 may include a circuit/module for operating 520 and configured to manage operation of data received from the vibration device 503 and to perform input/output operations associated with access to the Internet web and perform, for example, methods described herein. For example, the processor 506 may include a data storage 522 system/function/module/device configured to store data including data including but not limited to sensory data, event data, threshold levels, sensor data, frequency data, and previously collected data sets. For example, the processor 506 may include a file system/function/module/device 524 configured to control how data in local data storage and/or remote data storage is stored and retrieved. For example, the processor 506 may include a sensor system/function/module/device 526 configured to control sensor input.

In some aspects of the disclosure, the non-transient computer readable medium 308 of the user interface module 500 may include instructions that may cause the various systems/functions/modules/devices of the processor 506 to perform the methods described herein. For example, the non-transient computer readable medium 508 may include operating instructions or code 534 to the circuit/module for operating 520. For example, the non-transient computer readable medium 508 may include a data storage instructions 536 corresponding to the data storage system/function/module/device 522. For example, the non-transient computer readable medium 508 may include file system instructions 538 corresponding to the file system/function/module/device 524. For example, the non-transient computer readable medium 508 may include sensor instructions 538 corresponding to the sensor system/function/module/device 540.

While the foregoing disclosure shows illustrative aspects, it should be noted that various changes and modifications could be made herein without departing from the scope of the disclosure as defined by the appended claims. The functions, steps and/or actions of the method claims in accordance with the aspects described herein need not be performed in any particular order. Furthermore, although elements of aspects disclosed herein may be described or claimed in the singular, the plural is contemplated unless limitation to the singular is explicitly stated.

Aspects described in connection with a given description, illustration, representation, or method may be substituted for aspects described in a different description, illustration, representation, or method.

The word "aspects" does not require that all aspects of the disclosure include the discussed tab, advantage, or mode of operation.

The word "coupled" is used herein to refer to the direct or indirect coupling between two objects. For example, if object A physically touches object B, and object B touches object C, then objects A and C may still be considered coupled to one another—even if they do not directly physically touch each other.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the aspects described herein. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel aspects disclosed herein.

As used herein, the term "determining" or "determine" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An automated vibration device, comprising:
   a computing device integrated into the automated vibration device, the computing device comprising:
     a processor;
     a communication interface;
     a memory coupled to the processor and the communication interface; and
     a controller operably connected to the communication interface and the memory, wherein the controller is configured to:
       collect data from one or more sensors on the vibration device, the sensors comprising at least one of a weight sensor, a force sensor, or a range detector;
       record the data in the memory;
       calculate, using the data, vibration patterns to be applied to the vibration device, wherein the vibration patterns include sagittal and transverse vibration components and cause multi-axial vibration synchronized to user movement detected from the one or more sensors;
       dynamically determine interference patterns between the sagittal and transverse vibration motor outputs, based on the calculated vibration patterns;
       adjust the vibration patterns in real-time using a feedback loop based on sensor data and historical user profiles;
       provide instructions to one or more vibration mechanisms on the vibration device based on the calculated vibration patterns and the interference patterns, the instructions causing real-time adjustment of the vibration patterns during operation.

2. The automated vibration device of claim 1, further comprising a server in communication with the vibration device and control module for storing sequences of vibration patterns.

3. The automated vibration device of claim 2, wherein the controller is further configured to update the sequences of vibration patterns on the server.

4. The automated vibration device of claim 1, wherein the control module can retrieve current or past input from a user to determine the appropriate sequence of commands of vibration patterns associated with a particular expected outcome.

5. The automated vibration device of claim 1, wherein the one or more sensors indicate where a user is applying pressure on the vibration device.

6. The automated vibration device of claim 1, wherein the control module is further configured to control adjust of multi-axial vibration of the vibration device by calculating interference patterns caused by the one or more vibration mechanisms to produce a particular vibration pattern at a particular location relative to the vibration device.

7. An automated vibration device, comprising:
a computing device integrated into the automated vibration device, the computing device comprising:
a processor;
a communication interface;
a memory coupled to the processor and the communication interface; and
a controller operably connected to the communication interface and the memory, wherein the controller is configured to:
collect data from one or more sensors on the vibration device, the sensors comprising at least one of a weight sensor, a force sensor, a range detector, or a camera;
record the data in the memory;
calculate, using the data, vibration patterns to be applied to the vibration device, wherein the vibration patterns include sagittal and transverse vibration components;
dynamically determine interference patterns between the sagittal and transverse vibration motor outputs, based on the calculated vibration patterns;
adjust the vibration patterns in real-time using a feedback loop based on sensor data and historical user profiles;
provide instructions to one or more vibration mechanisms on the vibration device based on the calculated vibration patterns and the interference patterns, the instructions causing real-time adjustment of the vibration patterns during operation; and
wherein the vibration patterns and interference patterns are customized in real-time based on user-specific sensor data comprising posture, weight distribution, or historical usage information.

8. The automated vibration device of claim 7, further comprising a server in communication with the vibration device and control module for storing sequences of vibration patterns.

9. The automated vibration device of claim 8, wherein the controller is further configured to update the sequences of vibration patterns on the server.

10. The automated vibration device of claim 7, wherein the control module can retrieve current or past input from a user to determine the appropriate sequence of commands of vibration patterns associated with a particular expected outcome.

11. The automated vibration device of claim 7, wherein the one or more sensors indicate where a user is applying pressure on the vibration device.

12. The automated vibration device of claim 7, further configured to control adjust of multi-axial vibration of the vibration device by calculating interference patterns caused by the one or more vibration mechanisms to produce a particular vibration pattern at a particular location relative to the vibration device.

13. The automated vibration device of claim 1, wherein the controller is further configured to determine a posture of the user based on image data captured by a camera on the vibration device and processed by a machine learning model, the machine learning model comprising PoseNet.

14. The automated vibration device of claim 1, wherein the controller is further configured to adjust the sagittal and transverse motor outputs in real time based on user-specific sensor data to customize vibration delivery according to the user's posture, weight distribution, or historical usage profile.

15. The automated vibration device of claim 1, wherein the controller is further configured to automatically initiate a vibration session based on detection of user presence or positioning, without requiring manual input from the user.

16. The automated vibration device of claim 1, wherein the controller is further configured to automatically initiate and progress through a vibration therapy sequence without requiring manual intervention.

* * * * *